United States Patent Office 2,983,234
Patented May 9, 1961

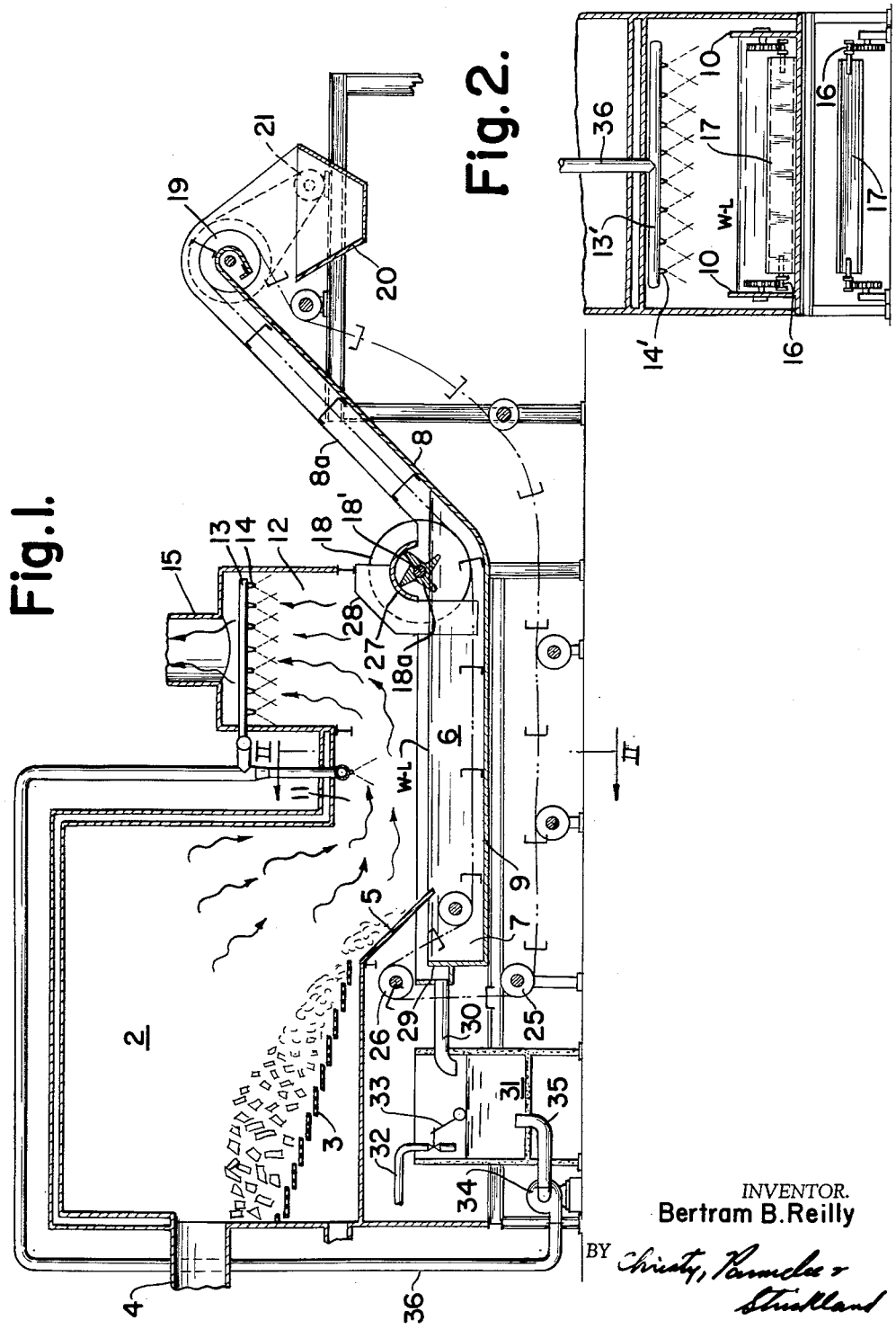

2,983,234

INCINERATOR AND ASH REMOVAL AND GAS SCRUBBING APPARATUS THEREFOR

Bertram B. Reilly, Pittsburgh, Pa., assignor to Dravo Corporation, Pittsburgh, Pa., a corporation of Pennsylvania Filed Nov. 19, 1958, Ser. No. 774,971

10 Claims. (Cl. 110—8)

This invention relates to large rubbish and garbage incinerators, and is especially useful for, but not limited to, incinerators of the kind generally termed "municipal incinerators," and relates more particularly to the cleaning of the flue gases and disposition of solid residues after the combustion of the refuse material has been completed.

One method of cleaning incinerator combustion gases so as to comply with regulatory air pollution codes is to conduct the gases through water sprays and/or to bubble the gases through shallow layers of water in bubble trays in such manner that fly ash and other small solid particles are entrained in the water. In installations presently in use, this water must be collected carried to an external clarification system, and the solids removed from the clarifier of whatever type is employed. The bulk of the solid ash and other refuse from the incinerator which is not fly ash or other small solids entrained in the flue gases, is separately carried away to a receiving hopper.

An important object of the present invention is to provide in an incinerator plant an improved construction in which all of the solid residues are removed together, instead of separately.

A further important object is to eliminate any external water clarification system, and to provide a unique system of extracting the fly ash and recirculating the water.

Still further objects are to provide an improved ash removal and scrubber plant for incinerators.

These and other objects and advantages are secured by my invention, as will more fully appear from the accompanying detailed description in connection with the accompanying drawings, in which:

Fig. 1 is a somewhat schematic view of an incinerator plant which embodies my invention, the drawing being in the nature of a longitudinal vertical section along the center line of the incinerator plant; and Fig. 2 is a transverse section in the plane of line II—II of Fig. 1.

In the drawing, 2 designates the combustion chamber of an incinerator of any suitable type, but which is here shown as having spaced metal walls between which a water or gas circulating space is provided. There is a stoker grate 3 which slopes downwardly toward its discharge end, and which forms not part of the present invention, being any well-known type of conveyor grate. There is a charging opening 4 in the front wall of the furnace through which material to be burned is charged into the furnace.

At the discharge end of the grate there is an apron 5 over which the ash and unburned refuse slide into an elongated trough 6, the forward end 7 of which extends under the discharge end of the grate, and the other or rear end wall 8 of which slopes continuously from the level of the flat bottom 9 upwardly to a level well above the level of the tank. There are side walls 10 along each side of the tank. Water is maintained in the trough to the level of the line W—L indicated in the drawing.

At the rear end of the combustion chamber just above the water level there is a rearwardly-extending horizontal flue 11 that opens into an enclosed scrubbing chamber 12. The scrubber may be one of several available types in which the flue gases are brought into contact with circulating water, and for purposes of illustration I have shown as illustrative of some such scrubber, a simple spray type unit. As here illustrated there is a system of manifolds in the upper part of the chamber designated generally as 13, from which depend a plurality of spray nozzles 14, the manifolds and nozzles being arranged to fill the chamber 12 with a fine water spray or mist in a manner well known in the art. At the top of the chamber 12 is a flue gas outlet duct 15 leading to a stack or induced draft fan, or which may be the lower end of the stack. The arrangement is such that the flue gas must pass through the spray to escape from the chamber 12, or otherwise be brought into intimate contact with water that moves in a generally countercurrent direction, whereby the entrained solids and fly ash are wet by the spray and fall with the water. Of interest to my invention is the fact that the trough 6 extends completely under the scrubber, so that all of the water from the scrubber, along with its entrained solids and the solids from the grate, fall into the trough.

According to the present invention there is an endless conveyor comprised of two sprocket chains 16 spaced so as to be just the width of the interior of the trough 6, and at regular intervals there are transverse flights or scrapers 17, which are joined to the links of the drag chains so as to be moved along by the chains. This drag chain conveyor has its flights riding on the bottom of the trough. At the rear end of the trough the chains pass under large idler sprockets 18. The flights then move up the sloping rear end wall 8, which has sides 8a, to the top where the chains pass over the head sprockets 19 which are driven by a motor 21, while the refuse falls into a hopper 20, back under the trough, being supported on idler sprockets at intervals. Beyond the forward end of the trough the conveyor passes around sprocket 25 to a sprocket 26 above the end of the trough, and from which it slopes down into the forward end of the trough, preferably terminating below the water line.

On the shaft 18' that connects the sprockets 18 there is a star-shaped seal or paddle-wheel type of seal 18a, the radial vanes of which dip into the water in the tank, and which move under a hood 27 that extends around the exposed periphery of the rotating seal. At each end of the rotating seal the hood is enlarged to partly encompass the periphery of the sprockets 18 as indicated at 28.

At some point along the top of the trough where the water is of maximum clarity, as for example at the front end of the trough, there is an overflow weir 29 from which leads a drain pipe 30 that empties into a storage tank 31. There is a water supply pipe 32 controlled by a float valve 33 which supplies make-up water to the tank 31. A pump 34 removes water from the tank 31 through a pipe 35 and forces it under pressure into a pipe 36 leading to the manifold system 13 in the scrubber.

In the operation of the apparatus the trough 6 is initially filled to the point where it will overflow into the weir and maintain the water line as indicated at W—L. The required amount of water is also initially introduced into the tank 31. As the incinerator operates, ash is discharged down the apron 5 into the trough 6 so that the ash is wetted and quenched, and most of it settles to the bottom of the trough. It is then dragged by the flight conveyor along the bottom of the trough and up the inclined rear wall 8 from whence it is discharged into the receiving hopper 20. Any ash which floats on the surface eventually reaches the paddle wheel 18a and is moved by the paddle wheel toward the discharge end of the trough while the radial paddles of the paddle wheel which dip into the water prevent the free ingress of air. The flue gases flow through the flue 11 at the rear end of the combustion chamber and will carry with them fly ash, dust and other small solid particles. These are removed by the scrubber and carried down into the trough 6. Most of these fine particles will eventually settle to the bottom of the trough and be moved away with the main body of the ash by the continuous conveyor. Some of them may float on the surface and be removed in the manner above indicated, while some may remain in suspension until such time as they eventually settle.

Water is continuously supplied to the scrubber, and this water collects in the trough 6. It overflows into the weir 29, and from there is returned to the tank 31 to be recirculated through the scrubber. Since there will be a constant evaporation of water and absorption of water in the ash, fresh make-up water is supplied through the pipe 32 and the float valve 33, but only so much make-up water is supplied as is required to keep the volume in the system constant. While there may be some solids in suspension in the water which is thus recirculated, the size and volume of these particles will not be sufficient to interfere with the functioning of the combustion gas washing apparatus.

As shown in the drawings, there may also be provided one or more transverse manifolds 13' with nozzles 14' in the upper part of the flue 11, supplied with water from the pipe 36. This will complement the main scrubber, and the water from the spray nozzles will also fall into the trough 6.

It will thus be seen that with the present invention all of the ash and unburned residue is carried to the storage hopper 20, from which it may from time to time be removed and hauled away. There is no need for any external clarification system for the water which passes through the scrubber, and hence no need for separate apparatus to carry away the fly ash from such clarification system, and no disposal problem for the water is encountered. The entire apparatus is enclosed sufficiently so that there is little free access of outside air to the combustion chamber or the flue gases so that the combustion can be properly controlled and excess free air in the flue gases to be handled by the draft induction fan or stack is kept to a minimum.

While I have shown and described one particular embodiment of my invention it will be understood that various parts may be changed and modified within the contemplation of my invention and under the scope of the following claims.

I claim:

1. Incinerator apparatus of the class described having a combustion chamber and a conveyor grate in the combustion chamber that progresses the material being incinerated toward one end of the grate, a flue for combustion gases leading from the combustion chamber at the discharge end of the grate, a scrubber into which the flue opens and in which the gases are brought into contact with water, an elongated trough extending from the discharge end of the grate under the flue and scrubber, said trough having an inclined end wall at the rear end beyond the scrubber sloping upwardly and rearwardly with respect to the bottom of the trough, the trough being positioned to receive ash from the grate and the water from the scrubber, and a continuous flight conveyor which enters the trough at its forward end under the grate, drags along the bottom of the trough and up the inclined end wall of the trough, an ash receiving hopper at the upper end of the inclined end of the trough along which the conveyor moves, the conveyor then returning under the trough and upwardly to its point of re-entry into the trough, there being means for guiding the conveyor, and driving means for the conveyor.

2. Incinerator apparatus as defined in claim 1 in which there is an overflow outlet for maintaining a constant water level in the trough, a tank into which the overflow is conducted, means for circulating water from said tank to the scrubber, and means for supplying make-up water to the tank to replace that which is evaporated or absorbed into the refuse.

3. Incinerator apparatus as defined in claim 2 in which there is a means forming an air seal at the discharge end of the trough including paddles which dip into the trough below the normal water line, means for rotating said paddles, an enclosing hood under and against which the paddles move as they rotate in the space above the water level.

4. Incinerator apparatus as defined in claim 3 in which the means for driving the rotating said paddles comprises idler wheels at the discharge end of the trough engaging the conveyor to hold it against the bottom and sloping end wall of the trough at the point where the conveyor moves from the bottom of the trough up the inclined rear end wall, said wheels being rotated by their engagement with the conveyor.

5. Incinerator apparatus as defined in claim 4 in which there is an enclosure about the idler wheels to prevent the free influx of air into the scrubber.

6. Incinerator apparatus as defined in claim 1 in which the conveyor comprises parallel continuous sprocket chains separated from each other a distance substantially equal to the width of the interior of the trough, and transverse flights extending between the chains at spaced intervals and having their ends attached to the chains.

7. An incinerator having a combustion chamber and traveling grate over which the rubbish is burned as it progresses from the front to the rear of the combustion chamber and wherein there is a burned gas outlet flue extending horizontally at the bottom of the rear wall of the combustion chamber, a trough extending from under the discharge end of the grate rearwardly under the flue and which forms the bottom of the flue, a scrubber over the rear end of the trough into which said flue opens and in which the flue gases are brought into contact with a countercurrent flow of water, the trough being positioned to receive ash and unburned refuse from the grate and the water from the scrubber said trough having an upwardly and rearwardly sloping end wall at the rear end beyond the scrubber terminating above the level in the trough, an endless flight conveyor entering the trough at its forward end and movable along the bottom of the trough, up the sloping rear wall beyond the upper end of the rear wall and then returning under the trough to the place where it re-enters the trough, means for supporting and guiding the conveyor in its continuous travel, means for driving the conveyor, a water tank, means for circulating water from the tank to the scrubber, means for carrying overflow from the trough to the tank, and means for supplying make-up water to the tank.

8. The apparatus defined in claim 7 wherein there is means at the rear end of the trough for moving floating material toward the sloping rear end wall of the trough and closing said end of the trough against the free inflow of air to the scrubber above the water level in the trough.

9. An incinerator comprising a horizontally elongated chamber having front, rear, side and top walls, the front wall having a charging opening therethrough, an inclined grate sloping downwardly from below said opening in the front wall toward the rear wall, a bottom for the chamber under the grate extending rearwardly toward but terminating forwardly of the rear wall so that the bottom of the combustion chamber opens downwardly, a flue extending horizontally from the lower portion of the back wall to receive gases from the combustion chamber, a vertical scrubber chamber extending upwardly from the rear end of the flue, a water-holding trough extending continuously under the open bottom of the combustion chamber under the flue and the scrubber chamber, the bottom of the combustion chamber having a downwardly-turned portion extending into the trough adjacent the year end of the grate whereby ash discharged from the grate may fall into the trough through the open bottom while the downturned bottom portion of the wall forms a seal with water in the trough, and means for conveying solids along the bottom of the trough and discharging them at the rear end of the trough rearwardly of the scrubber chamber.

10. An incinerator comprising a horizontally elongated chamber having front, rear, side and top walls, the front wall having a charging opening therethrough, an inclined grate sloping downwardly from below said opening in the front wall toward the rear wall, a bottom for the chamber under the grate extending rearwardly toward but terminating forwardly of the rear wall so that the bottom of the combustion chamber opens downwardly, a flue extending horizontally from the lower portion of the back wall to receive gases from the combustion chamber, a vertical scrubber chamber extending upwardly from the rear end of the flue, a water-holding trough extending continuously under the open bottom of the combustion chamber under the flue and the scrubber chamber, the bottom of the combustion chamber having a downwardly-turned portion extending into the trough adjacent the rear end of the grate whereby ash discharged from the grate may fall into the trough through the open bottom while the downturned bottom portion of the wall forms a seal with water in the trough, the rear end of the trough comprising an upwardly and rearwardly-extending chute, and an endless drag conveyor entering the forward end of the trough forwardly of the downturned portion of the bottom wall of the combustion chamber, then extending rearwardly along the bottom of the trough and up said chute and returning from the upper end of the chute under the trough to the point where it re-enters the trough.

References Cited in the file of this patent
UNITED STATES PATENTS

| | | |
|---|---|---|
| 2,346,068 | Foresman | Apr. 4, 1944 |
| 2,513,174 | Hess | June 27, 1950 |
| 2,585,440 | Collins | Feb. 12, 1952 |

FOREIGN PATENTS

| | | |
|---|---|---|
| 512,256 | Belgium | July 15, 1952 |
| 197,847 | Great Britain | May 24, 1923 |